C. W. CONGER.

ELECTRIC LANTERN.

APPLICATION FILED SEPT. 1, 1920.

Reissued Mar. 28, 1922. 15,317.

Inventor

C. W. Conger.

By T. J. Geisler

Attorney

UNITED STATES PATENT OFFICE.

CHARLES W. CONGER, OF PORTLAND, OREGON, ASSIGNOR OF ONE-THIRD TO FLORENCE R. BLAKELEY, OF PORTLAND, OREGON.

ELECTRIC LANTERN.

15,317. Specification of Reissued Letters Patent. Reissued Mar. 28, 1922.

Original No. 1,277,549, dated September 3, 1918, Serial No. 186,014, filed August 13, 1917. Application for reissue filed September 1, 1920. Serial No. 407,532.

*To all whom it may concern:*

Be it known that I, CHARLES W. CONGER, a citizen of the United States, residing at Portland, in the county of Multnomah, State of Oregon, have invented certain new and useful Improvements in Electric Lanterns; and I do hereby declare the following to be a full, clear, and exact description of the invention, such as will enable others skilled in the art to which it appertains to make and use the same.

This invention has for its object the providing of a lantern of simple, comparatively inexpensive and durable construction, furthermore having its lamp so arranged with reference to an uninterrupted reflecting surface that the rays of light will be directed downward on the ground, such rays being so diffused as to dissipate the shadows occasioned by the lamp support.

I attain my object by supporting the lamp on a skeleton frame projecting below the lantern body, and so that the lamp will be pointed towards the centre of the base of said body, said base being adapted to serve as a light reflector.

Other features of my invention are hereinafter set forth.

Figure 1:
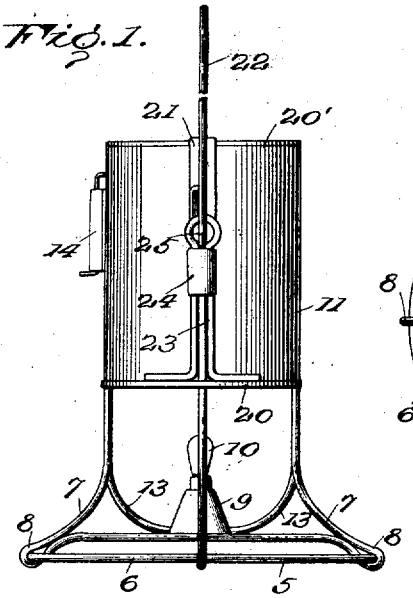
Figure 1 is a side elevation of a lantern constructed in accordance with my invention.
Figure 2:
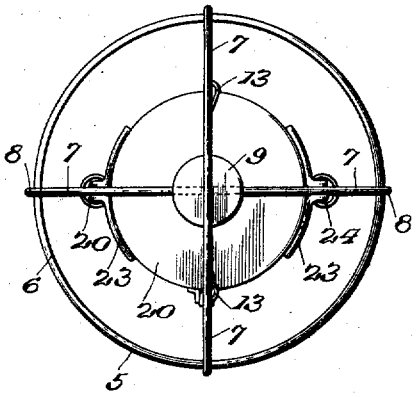
Fig. 2 is a bottom plan view thereof.
Figure 3:
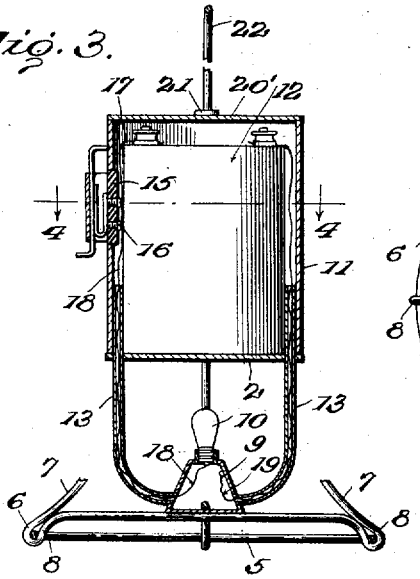
Fig. 3 is a central vertical sectional view.
Figure 4:
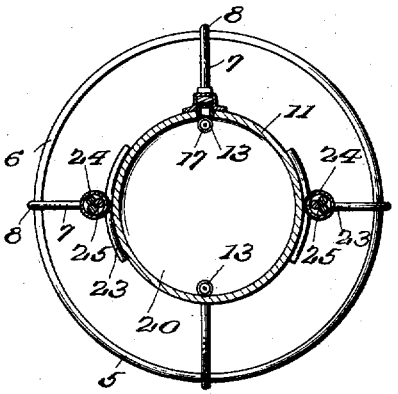
Fig. 4 is a transverse section taken on the line 4—4 of Fig. 3, the battery being removed.

My device consists of a skeleton base 5 including a circular bottom ring 6 of greater diameter than the base or bottom of the lantern body; and equidistantly spaced pairs of uprights 7, each pair of said uprights being preferably formed from a single length of relatively heavy wire that is bent into substantially U-shape, and embraces diametrically opposite points of the ring 6 at the junction of its arms with its connecting bight portion 8. Said bight portions 8 of the wires extend diametrically of the ring 6 and cross each other at approximately the center of the latter. At their point of crossing is affixed a lamp socket 9 for holding an electric lamp 10. The uprights 7 support at their upper extremities a receptacle 11 in which is contained a battery 12.

Tubes 13 lead downward from the receptacle 11 along opposed uprights 7 and are bent to extend into the socket 9. The side of the receptacle has slide switch 14 adapted to engage the terminals 15 and 16 to close the circuit, the switch being normally disengaged from the terminal 15 whereby the circuit is open. A wire 17 leads from one pole of the battery 12 to the terminal 15 of the switch while a second wire 18 leads from the other terminal 16 and through one of the tubes 13 to the socket 9. A third wire 19 leads from the socket 9 through the other tube 13 to the other pole of the battery. Thus the battery 12, lamp 10 and socket 9 are connected in circuit so that by operating the switch the lamp is turned on and off.

It will be noted that the bottom 20 of the receptacle 12 is disposed above and spaced from the lamp 10, and when suitably polished or otherwise treated provides an efficient uninterrupted reflecting surface, which because of the spaced relation of the lamp, the light rays are reflected downwardly onto the ground.

As obvious the bottom of the lamp supporting frame serves as a protection to the lamp, and an indirect lighting effect is obtained. The lamp is supported spaced from the light reflecting bottom or base of the lantern body, but pointed toward the said base; and by reason of such position of the lamp with respect to said base of the lantern body, ample rays are permitted to pass upward beyond said base for illuminating a substantial area above the lantern body when the lantern is in vertical position. Besides the lamp is never hidden at any angle the lantern may be swung. In brief my lantern is eminently adapted for use as a railroad men's or signaling lantern.

The lamp socket is made as small a diameter as practical so as to cause only a minimum obstruction of the downward reflected light rays, and the obstruction of said light rays by the crossed bars of the frame portion supporting said lamp socket is negligible.

The person carrying the lantern will not become blinded by the light shining into his eyes as is the case with lanterns of other types, while the surface which he is traversing will be effectually illuminated. The receptacle 11 is equipped with a top 20′ removably held in place by means of spring fasteners 21, while there is also provided for carrying the lantern a bail 22 that is pivotally carried by arm 23 secured to the sides of the receptacle, there being mounted on said arms slides 24 and provided on the bail ends extensions 25 that are engaged by the slides so as to maintain the bail in rigid relation to the receptacle to prevent swinging of the latter as it is carried.

What I claim is:—

1. In an electric lantern, the combination of a receptacle provided on its underside with a reflecting surface, said receptacle adapted to receive a battery, a skeleton frame depending from the receptacle, lamp supporting means mounted centrally of and on the bottom of the skeleton frame adapted to receive a light source extending toward the bottom of the reflecting surface and spaced therefrom, whereby the reflecting surface is uninterrupted and the rays of light are so diffused as to substantially dissipate the shadows occasioned by the lamp supporting means and the skeleton frame, and a switch and wires between the receptacle and the lamp supporting means.

2. In an electric lantern, the combination of a receptacle adapted to receive a battery and provided on its under side with a reflecting surface, a skeleton frame depending from the receptacle, said frame comprising a plurality of bars bent to form eyes and horizontal members disposed across each other between the eyes and extending upwardly from said eyes and their free ends secured to the lower outside portion of the receptacle, an annular bracing member secured by and in the eyes, a lamp socket mounted centrally on the cross bars of the frame and extending upwardly therefrom and adapted to receive a lamp globe spaced from the reflecting surface, and wires between the receptacle and lamp socket to convey current to the latter.

3. In an electric lantern, the combination of a receptacle adapted to receive a battery and provided on its under side with a reflecting surface, a skeleton frame depending from the receptacle, said frame comprising a plurality of bars bent to form eyes and horizontal members disposed across each other between the eyes and extending upwardly from said eyes and their free ends secured to the lower outside portion of the receptacle, an annular bracing member secured by and in the eyes, a lamp socket interposed between the cross bars and the reflecting surface and adapted to receive a lamp globe, and wires between the receptacle and the globe to supply current from the battery to the lamp globe.

CHARLES W. CONGER.